United States Patent
Jump et al.

(10) Patent No.: US 6,241,252 B1
(45) Date of Patent: Jun. 5, 2001

(54) LABYRINTH SEAL AND METHOD OF MAKING SAME

(75) Inventors: Kenneth L. Jump, Arvada; Gary A. Mansdorfer, Louisville, both of CO (US)

(73) Assignee: Jemco Seal Corporation, Broomfield, CO (US)

( * ) Notice: Subject to any disclaimer, the term of this patent is extended or adjusted under 35 U.S.C. 154(b) by 0 days.

(21) Appl. No.: 09/330,802

(22) Filed: Jun. 11, 1999

(51) Int. Cl.[7] .................................................. F16J 15/32
(52) U.S. Cl. ........................ 277/353; 277/346; 277/351; 277/421; 277/412
(58) Field of Search .................................... 277/346, 348, 277/439, 351, 421, 412, 364, 372, 370, 353

(56) References Cited

U.S. PATENT DOCUMENTS

| | | | |
|---|---|---|---|
| 5,316,317 | * 5/1994 | Federovich et al. ................. 277/1 |
| 5,503,407 | * 4/1996 | McNickle ............................. 277/346 |
| 6,024,362 | * 2/2000 | Fedorovich .......................... 277/351 |
| 6,059,292 | * 5/2000 | Firestone ............................. 277/301 |

* cited by examiner

Primary Examiner—Anthony Knight
Assistant Examiner—Enoch E Peavey
(74) Attorney, Agent, or Firm—John E. Reilly

(57) ABSTRACT

A seal assembly is adapted for mounting between a rotatable shaft and an outer stationary housing, the seal assembly being made up of a metal sleeve in surrounding relation to the shaft, a non-metallic resilient seat in surrounding relation to the sleeve, the seat being heat-expandable to permit placement over the sleeve and, upon cooling, will contract or shrink into snug-fitting engagement with the sleeve along selected areas with labyrinth grooves formed along the inner surface of the seat between the selected areas of sealed engagement; and an excluder ring is mounted on one end of the seat along with an annular drive lock which is wedged into one end of the sleeve so as to impart rotation of the shaft into the sleeve and excluder ring.

15 Claims, 3 Drawing Sheets

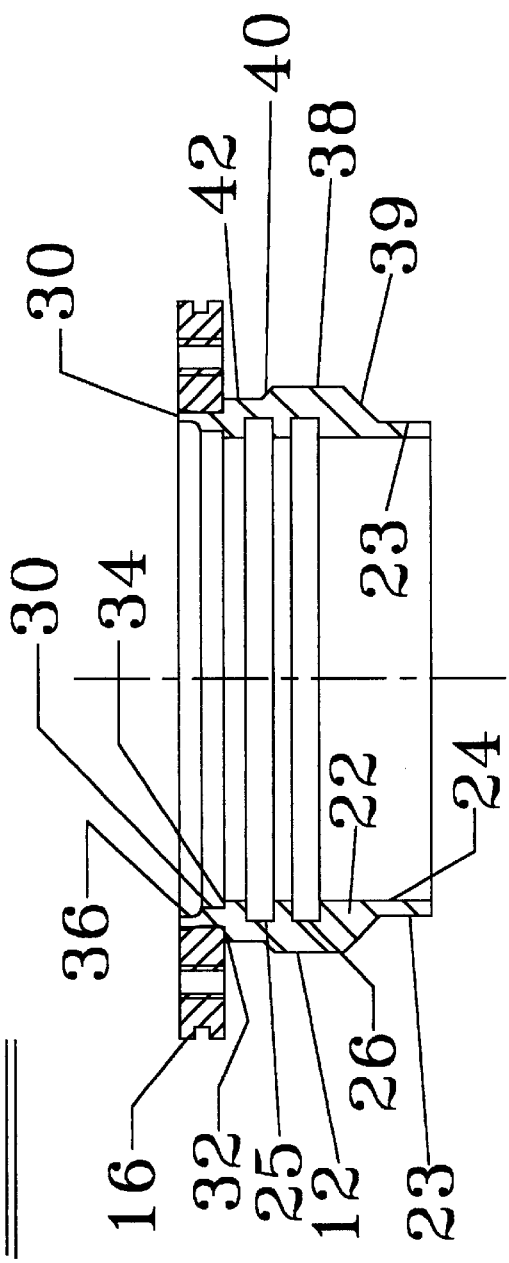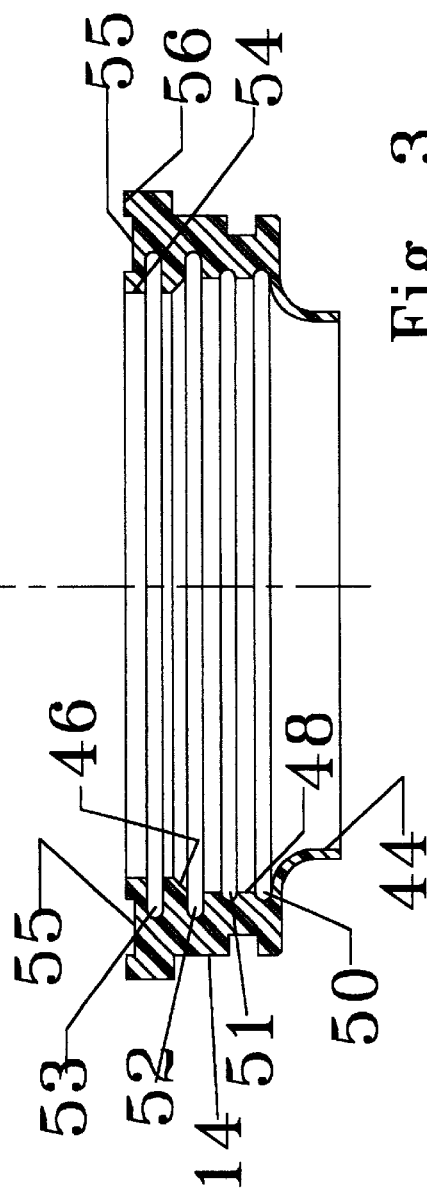

LABYRINTH SEAL AND METHOD OF MAKING SAME

BACKGROUND AND FIELD OF INVENTION

This invention relates to seals, and more particularly relates to a novel and improved labyrinth-type seal specifically adapted for use between a rotating shaft and outer stationary housing.

Various types of seal assemblies have been devised for installation between relatively moving members, such as, for example, an inner rotating shaft and outer stationary housing. Among other requisites is the ability to seal the shaft from contamination as well as to assure that the seal assembly is positively locked or fixed to the shaft for rotation. Moreover, in certain environments in which the seal assembly is exposed to oil mist or vapors, it is desirable to establish proper sealing characteristics between an outer sealing member which remains stationary with the housing and inner relatively rotating member on the shaft and thus permit the entry of oil mist or vapor to some extent but preclude the entry of contaminants. For this reason, a seal assembly which combines a lip seal and facial seal is highly desirable and which will maintain requisite sealing characteristics notwithstanding at least a limited degree of relative movement in an axial direction between the housing and shaft.

SUMMARY OF THE INVENTION

It is therefore an object of this invention to provide for a novel and improved seal assembly which is highly efficient, durable and reliable in use.

It is another object of the present invention to provide for a novel and improved radial and facial seal assembly which is specifically adaptable for use between a rotating shaft and outer stationary housing, and specifically wherein the seal is effectively locked to the shaft and maintains sealed engagement with the shaft notwithstanding axial play between the shaft and outer housing.

An additional object of the present invention is to provide in a seal assembly for a novel and improved resilient seating member between relatively moving members to be sealed and which is so mounted with respect to a rotating element as to efficiently exclude contaminants and which incorporates a lip seal having the ability to increase its sealing force in response to increasing liquid or fluid pressure along the outside of the lip seal during operation.

In accordance with the present invention, a seal assembly has been devised for mounting between radially inner and outer relatively rotating members comprising a first sleeve member in sealed engagement with the inner relatively rotating member, a second sleeve member having an external portion in sealed engagement with the outer relatively rotating member and an inner portion in sealed engagement with a complementary portion on the first sleeve, there being labyrinth grooves formed between the inner and outer sleeves, an excluder ring mounted on an upper surface of the second sleeve, and a lock ring having a wedge-shaped extension between the first sleeve and inner relatively rotating member. In the preferred form, the inner relatively rotating member has a rotating shaft and the outer relatively rotating member is defined by a stationary housing, the lock ring imparting rotation of the shaft to the first sleeve member. The excluder ring follows the rotation of the lock ring and rotates with respect to the second sleeve while forming a facial seal along an upper grooved surface of the second sleeve member. An additional feature of the seal assembly resides in the lip seal which forms an extension of the second sleeve member and is contracted against the outer surface of the first sleeve member. The second sleeve member is further characterized by having an inner seating surface bearing against a complementary surface on the first sleeve member and being somewhat spring-loaded against the beveled surface to cooperate with the lip seal in forming a sealed labyrinth area between the first and second sleeve members. At the same time, the loading of the second sleeve member against the first sleeve member will force the upper grooved surface of the second sleeve member into firm bearing relationship against the excluder ring. Still another characteristic and desirable feature of the seal assembly is the method of making the seal assembly, specifically the mounting of the second sleeve member onto the first sleeve member, the second sleeve member being preferably composed of a graphite-filled Teflon material which when heated to a temperature on the order of 400° F. to 450° F. will expand sufficiently to be placed over the first sleeve and, in the process of cooling, will contract into snug-fitting engagement along the complementary seating surfaces and the lip seal.

In the foregoing, the more important features of the present invention have been outlined as a preliminary to the detailed description, but it is to be understood that additional features of the present invention are hereinafter described in conjunction with the detailed description and will at least in part form the subject matter of one or more of the claims. It is further to be understood that the invention is not limited in its application to the details of construction and arrangement of components set forth in the following description or illustrated in the drawings and is capable of other embodiments and applications. The phraseology and terminology employed herein are for the purpose of illustration but not limitation, and those skilled in the art should appreciate that the conception upon which this disclosure is based may readily be utilized as a basis for designing other structures, methods and systems for carrying out the present invention. It is therefore important that the claims be regarded as including such equivalent constructions to the extent that they do not depart from the spirit and scope of the present invention.

The above and other objects, advantages and features of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 2 is a sectional view of the sleeve and excluder ring of the preferred form of seal assembly shown in FIG. 1;

FIG. 3 is another sectional view of an outer sleeve of the preferred form of seal assembly shown in FIG. 1.

DETAILED DESCRIPTION OF PREFERRED EMBODIMENT

Figure 1:
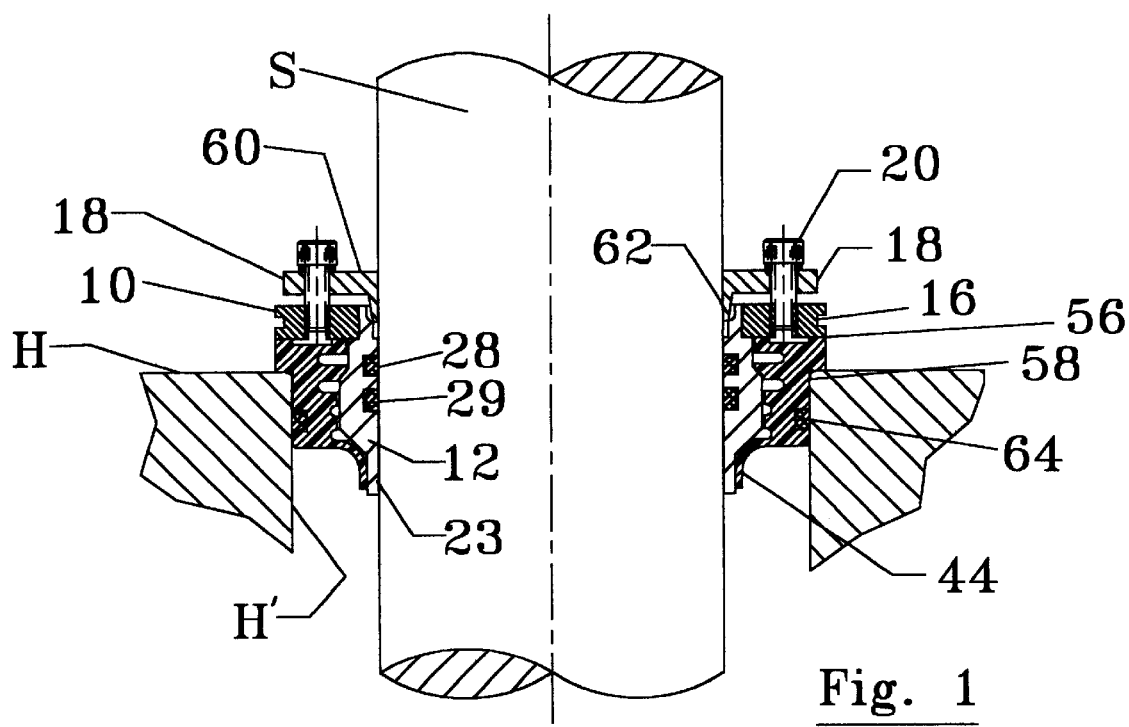
FIG. 1 is a sectional view of a preferred form of seal assembly in accordance with the present invention.
Figure 4:
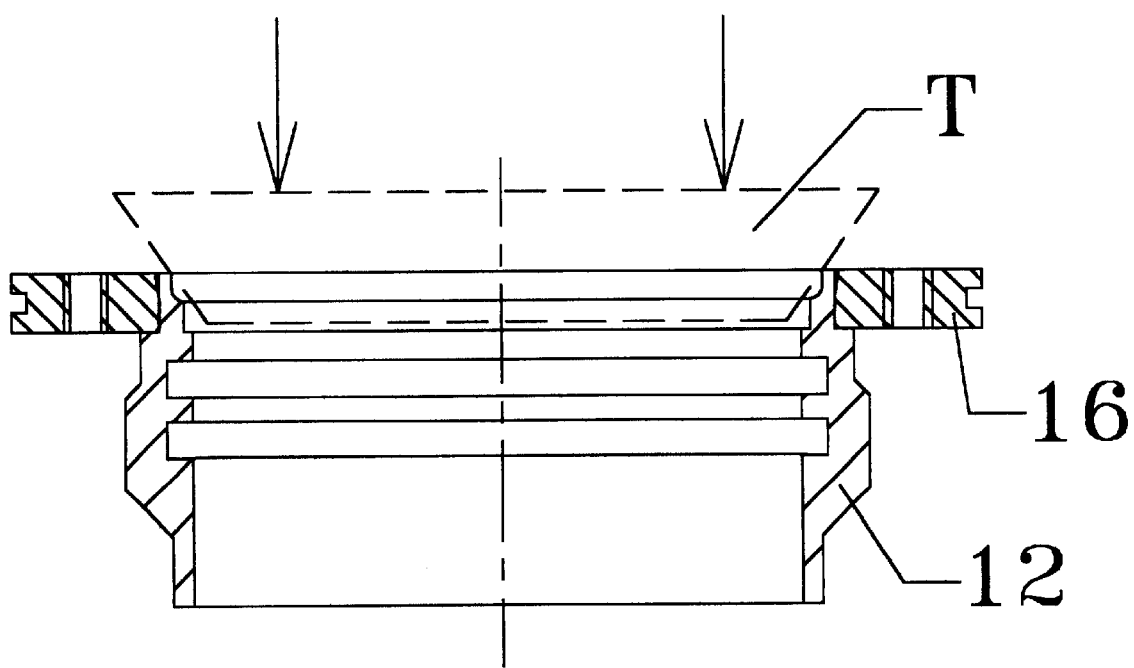
FIG. 4 is a sectional view similar to FIG. 2 illustrating the use of a swaging tool to expand one end of the sleeve.

Referring in more detail to the drawings, there is illustrated in FIGS. 1 and 2 a preferred form of seal assembly 10 which is broadly comprised of a metal sleeve 12, outer surrounding sleeve defining a seat 14 of a non-metallic material, such as, a graphite-filled Teflon of annular configuration, an annular metallic washer 16 surmounting the seat portion 14, and a drive lock 18 of annular configuration is fastened to the washer 16 by circumferentially spaced cap screws 20. A typical application of the seal assembly is illustrated in which the seal assembly 10 is interposed between a motor output shaft represented at S in a pump having a stationary housing, a fragmentary part of the housing being represented at H and disposed in outer spaced concentric relation to the shaft S. In the setting described, the sleeve 12 is clamped for rotation with the shaft S by the drive lock 18, and the seal 14 is firmly wedged against an axial wall H' of the housing H so as to be fixed against rotation.

Considering in more detail the preferred construction and arrangement of parts comprising the seal assembly 10, the sleeve 12 is more clearly shown in FIG. 2 and is made up of a relatively thick-walled intermediate portion 22 which tapers in one direction into an end wall 23 of uniform thickness and having an inner wall diameter as at 24 corresponding to that of the intermediate wall portion 22. However, the intermediate wall portion is interrupted by a pair of axially spaced grooves 25 and 26 on its inner wall surface for insertion of O-rings 28 and 29, as shown in FIG. 1. The body 22 also tapers in the opposite direction into an end wall 30 having an external shoulder 32 adapted to receive the radially inner wall surface or diameter of the washer 16. An internal shoulder 34 verges into a groove 36 at the terminal end which is of increased inner diameter to that of the internal shoulder 34 for a purpose to be described.

It should be noted further that the intermediate portion 22 of the sleeve 12 includes an axially extending external wall surface 38 which is tapered as at 39 to extend into the external surface of the end portion 23, and a tapered wall surface 40 forms a continuation of the wall surface 38 in the opposite direction into an axial extending wall surface 42.

The seat portion 14 is shown in detail in FIG. 3 and is preferably composed of a material that can be stretched over the inner sleeve 12 and then will shrink or contract as it cools, one such material being a graphite-filled TEFE (Teflon) material. As the seat 14 contracts, it is so dimensioned that its surfaces of engagement will be along an inner surface of a lip seal 44 which bears against the end portion 23 and a tapered surface portion 46 which bears against and is complementary to the tapered surface portion 40. An axially extending surface 48 is spaced slightly outwardly of the surface portion 38 of the inner sleeve and has a series of axially spaced, radially extending grooves 50, 51, 52 and 53. That area confined between the lip seal 44 and tapered wall surface 46 effectively forms a labyrinth-type seal including the grooves 50 to 52. The deeper radially extending groove 53 along wall surface 54 between the surface 46 and excluder ring 16 is also part of a labyrinth seal area that has limited communication with a shallow groove 55 on upper flat surface 56 of the seat portion 14.

The seat portion 14 when contracted into surface engagement with the tapered wall surface 40 will impart upward loading to the somewhat compressible material of the seat portion 14 causing the upper flat surface portion 56 to bear firmly against the excluder ring 16. The degree of loading increases with any increase in temperature in the environment in which the seal assembly is operated owing to the tendency of the seat portion 14 to expand as the temperature increases. An external seating portion or shoulder is mounted under compression along the wall H' of the housing H, and an O-ring 64 is inserted in the groove on the axial wall of the shoulder 58 to establish sealed engagement therebetween. The O-ring 64 as well as the O-rings 28 and 29 may be lubricated with a silicone grease or other lubricant in order to minimize any frictional engagement.

The excluder ring 16 is essentially in the form of a washer and is composed of a high strength metal which will tend to minimize any friction between the ring 16 and the upper flat surface 56. The ring 16 is of a thickness to fit into the external shoulder 32 on the inner sleeve 12 and be flush with the terminal end 30 of the sleeve 12. As a preliminary to mounting of the lock ring 18, a swaging tool T of generally frusto-conical configuration is inserted into the end of the sleeve 12 and hammered or driven axially into the clearance space or gap between the shoulder 34 and surface of the shaft S. The tool T is hammered under sufficient force to cause the axial wall surface of the shoulder 34 to diverge radially and upwardly slightly to force the end portion 30 into press-fitting engagement with the ring 16. Typically, the degree of spreading is on the order of 7° and will afford sufficient clearance for insertion of the lock ring 18 in a manner to be described.

The preferred form of lock ring 18 is composed of a high strength metal and includes an annular disk-shaped portion 60 of an inner diameter substantially corresponding to the external diameter of the shaft and provided with a downward tapered extension 62 on its inner diameter dimensioned to be inserted into the gap between the shoulder and shaft by the conical swaging tool T. Again, the locking ring 18 is positively attached to the washer 16 by the cap screws 20 so as to impart the rotation of the shaft S to the excluder ring 16 and inner sleeve 12 whereas the seating portion 14 remains fixed or stationary with the housing H.

In use, and assuming the elements to be in the vertical orientation as shown in the drawings, the lower lip seal 44 can be proportioned to be of different lengths according to the length of the end portion 23 to effectively prevent any liquids or foreign matter from passing between the lip seal and external wall surface of the end portion 23. Nevertheless, any lubricants or vapors that may pass between the lip seal 44 and wall surface 23 will effectively be captured in the labyrinth grooves 50–52. Similarly, the facial seal defined between the upper surface 56 and washer 16 will effectively exclude any foreign matter or lubricant particularly under rotation; any vapor or mist, however, may be free to seep between the inner face of the facial seal and into the gap between the seat 14 and sleeve 12. As noted earlier, the sealing force along the lip seal is increased by any pressure increases in the liquid surrounding the lip seal during operation. Again, the lip seal 44 can be of different lengths and thicknesses in cooperating with the internal shoulder 46 on the seat 14 to form a labyrinth therebetween so that any oil mist or vapor which leaks past the lip seal will collect in the labyrinth grooves. The Teflon seat 14 can expand when subjected to heat during operation but is constrained against outward radial expansion by the housing H so that effectively any expansion is radially inward to lessen the gap along the labyrinth. Moreover, if any axial movement occurs in the shaft, the relative movement is absorbed between the housing H and seat 14.

A particular characteristic of the seat 14 is its ability to contract into snug-fitting relation to the sleeve 12 as it cools and, in particular, the internal shoulder or seating portion 46 will move into firm engagement with the complementary shoulder 40 on the sleeve as a result of which the shoulder 46 will move upwardly along the external shoulder 40 to preload or compress the body of the seat 14 between the shoulder 40 and the excluder ring 16.

When the drive lock 18 is tightened by the cap screws 20, its tapered end 62 will advance downwardly and somewhat radially inwardly to be firmly wedged against the shaft S and effectively form the drive surface for rotation of the sleeve 12 with the shaft S. Only the lower portion of the drive lock 18 is contracted or tightened against the shaft but is sufficient to effectively be locked or joined to the shaft S to follow its rotation and in this manner effectively acts as a clamping member.

Each of the O-rings 28 and 29 is preferably lubricated, such as, with a silicone grease so as to minimize any frictional engagement between the O-rings 28, 29 and the shaft S. It will be evident that other types of lubricants may be employed and operate just as effectively.

While a preferred form of invention is herein set forth and described, it will be apparent that the above and other modifications and changes may be made in the construction and arrangement of parts as well as composition of materials and its application to different uses without departing from the spirit and scope of the present invention as defined by the appended claims and reasonable equivalents thereof.

What is claimed is:

1. In a seal assembly adapted to be mounted between radially inner and outer relatively rotating members, the improvement comprising:

a sleeve mounted in outer surrounding sealed engagement with said inner relatively rotating member;

a seat disposed in sealed engagement with said outer relatively rotating member, said seat having an inner beveled surface in sealed engagement with a complementary sealing surface on said sleeve, a lip seal in sealed relation to one end of said sleeve, and labyrinth grooves between said seal and said seat; and an excluder ring mounted on an end of said seat and disposed in sealed engagement to one end of said sleeve opposite to said lip seal, and means for imparting the rotation of said inner relatively rotating member to said sleeve and said excluder ring.

2. In a seal assembly according to claim 1 including a lock ring interposed between said inner relatively rotating member and said excluder ring.

3. In a seal assembly according to claim 1 wherein said inner relatively rotating member is a rotating shaft and said outer relatively rotating member is a stationary housing, and a lock ring imparting the rotation of said shaft to said sleeve and said excluder ring.

4. In a seal assembly according to claim 3 wherein said lock ring includes fastener means for positively connecting said lock ring to said excluder ring.

5. A seal assembly for mounting between radially inner and outer relatively moving members comprising:

a first sleeve member mounted in outer surrounding, sealed engagement with said inner relatively rotating member;

a second sleeve member having an external seating portion in sealed engagement with said outer relatively moving member and an interior seating portion in sealed engagement with a complementary seating portion on said first sleeve member, a lip seal in sealed relation to one end of said first sleeve member, and said first and second sleeve members having labyrinth grooves formed therebetween;

an excluder ring fixed to an end surface of said second sleeve member; and a lock ring interposed between said inner relatively rotating member and said end of said first sleeve member.

6. A seal assembly according to claim 5 wherein said lock ring includes means positively connecting said lock ring to said excluder ring.

7. A seal assembly according to claim 5 wherein said excluder ring is disposed in close-fitting sealed engagement to said end of said first sleeve member.

8. A seal assembly according to claim 5 wherein said inner relatively rotating member is a moving shaft and said outer relatively moving member is a stationary housing, said first sleeve member being rotatable with respect to said second sleeve member, and said second sleeve member defining a facial seal surface along its interface with said excluder ring.

9. A seal assembly according to claim 8 wherein said facial seal surface is provided with a groove therein.

10. A seal assembly according to claim 5 wherein said second sleeve member is mounted under compression between said complementary seating portion on said first sleeve member and said excluder ring.

11. In a seal assembly adapted to be mounted between a rotatable shaft and outer stationary housing, the improvement comprising:

a metal sleeve mounted in outer surrounding sealed engagement with said shaft;

a resilient seat disposed in sealed engagement with said housing, said seat having an inner tapered surface in sealed engagement with a complementary surface on said sleeve, a lip seal in sealed relation to one end of said sleeve, and labyrinth grooves between said lip seal and said tapered surface;

an excluder ring mounted on an end surface of said seat and disposed in sealed engagement to one end of said sleeve opposite to said lip seal, and wherein a lock ring is interposed between said shaft and said excluder ring, said lock ring including a tapered portion inserted in a gap between said shaft and said sleeve.

12. In a seal assembly according to claim 11, wherein said lock ring includes fastener means for positively connecting said lock ring to said excluder ring.

13. A seal assembly according to claim 5, a method of making said seal assembly comprising the steps of:

forming said second sleeve of a heat-expandable material; and heating said second sleeve and advancing into alignment with said first sleeve whereupon cooling of said second sleeve said interior seating portion will contract into sealed engagement with the complementary seating portion of said first sleeve and said lip seal will contract into sealed engagement with said first sleeve.

14. The method according to claim 13 wherein contraction of said interior seating portion and said lip seal into sealed engagement with said first sleeve a gap remains along said first and second sleeves between said lip seal and said interior seating portion.

15. The method according to claim 13 including the step of driving a swaging tool between one end of said first sleeve and said shaft to expand said one end of said first sleeve away from said shaft, and inserting said tapered portion into said gap formed between said first sleeve and said shaft.

* * * * *